(12) United States Patent
Aida et al.

(10) Patent No.: US 10,130,923 B2
(45) Date of Patent: Nov. 20, 2018

(54) METHOD FOR STIRRING RESIN PELLETS (71) Applicant: IDEMITSU KOSAN CO., LTD., Chiyoda-ku (JP)

(72) Inventors: Masao Aida, Ichihara (JP); Hokuto Yamasaki, Sodegaura (JP); Tatsuyoshi Yokota, Ichihara (JP); Yoshinori Sato, Ichihara (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 8 days.

(21) Appl. No.: 15/525,755

(22) PCT Filed: Nov. 13, 2015

(86) PCT No.: PCT/JP2015/081991
§ 371 (c)(1),
(2) Date: May 10, 2017

(87) PCT Pub. No.: WO2016/076421
PCT Pub. Date: May 19, 2016

(65) Prior Publication Data
US 2017/0335072 A1 Nov. 23, 2017

(30) Foreign Application Priority Data
Nov. 14, 2014 (JP) .................................. 2014-232220

(51) Int. Cl.
*B01F 7/22* (2006.01)
*C08J 3/12* (2006.01)
*B01F 7/00* (2006.01)

(52) U.S. Cl.
CPC ............ *B01F 7/22* (2013.01); *B01F 7/00633* (2013.01); *C08J 3/12* (2013.01); *B01F 2215/0409* (2013.01); *B01F 2215/0427* (2013.01); *B01F 2215/0431* (2013.01); *C08J 2323/12* (2013.01); *C08J 2323/14* (2013.01); *C08J 2353/00* (2013.01)

(58) Field of Classification Search
CPC ........... B01F 7/00341; B01F 7/16; B01F 7/22
See application file for complete search history.

(56) References Cited

U.S. PATENT DOCUMENTS

| 5,041,251 A | 8/1991 | McCoskey et al. |
| 5,623,012 A | 4/1997 | Hwo |
| 2006/0279019 A1 | 12/2006 | Di Federico et al. |

FOREIGN PATENT DOCUMENTS

| JP | 5-508116 A | 11/1993 |
| JP | 2003-160671 A | 6/2003 |
| JP | 2006-527288 A | 11/2006 |
| JP | 2011-184499 A | 9/2011 |

OTHER PUBLICATIONS

International Search Report dated Feb. 16, 2016, in PCT/JP2015/081991 filed Nov. 13, 2015.

*Primary Examiner* — Robert S Jones
(74) *Attorney, Agent, or Firm* — Oblon, McClelland, Maier & Neustadt, L.L.P.

(57) ABSTRACT

A method for stirring resin pellets, which includes stirring adhesive resin pellets in a liquid in a stirring tank equipped with a stirring impeller, under the condition satisfying the following relational expression (I):

$$\frac{\rho(Np^{1/3}nD)^2}{\Delta\rho g d p} \geq 10 \quad (\text{I})$$

wherein $\rho$ is the density of the liquid (kg/m³), $Np$ is the power number of the stirring impeller, $n$ is the rotational speed (1/s), $D$ is the diameter of the stirring impeller (m), $\Delta\rho$ is the difference in density between the resin pellets and the liquid (kg/m³), $g$ is the gravitational acceleration (m/s²), and $dp$ is the particle diameter of the resin pellets (m).

8 Claims, 4 Drawing Sheets

METHOD FOR STIRRING RESIN PELLETS

TECHNICAL FIELD

The present invention relates to a method for stirring resin pellets.

BACKGROUND ART

A melt after reaction in a reactor for polymerization or polycondensation is extruded out from the reactor, for example, as strands or a sheet, and cooled and solidified in a liquid such as water or the like, and thereafter pelletized with a pelletizer to give resin pellets.

In the case where the melt is a crystalline resin, the resin is uncrystallized just after pelletized with a pelletizer, and therefore has a problem in that the resin pellets may block to each other (for example, bonding or caking of resin pellets to each other) in a liquid such as water or the like.

A so-called soft resin also has a problem in that, when formed into pellets, the resin pellets may block to each other in a liquid.

As a method for preventing resin pellets from blocking to each other and for increasing the degree of crystallization of the resin in the form of pellets, there has been proposed a method for producing pellets of a crystalline polymer (for example, an aromatic copolyester, an aliphatic copolyester, etc.), wherein a melt of a crystalline polymer is extruded out as strands or a sheet, cooled and solidified, and thereafter pelletized with a pelletizer, and the resultant pellets in an uncrystallized state are mixed with pellets of the crystalline polymer that has been separately processed to have a degree of crystallization of 5% or more, and these are treated (for example, see PTL 1).

However, in the production method for crystalline polymer pellets mentioned above, pellets of a crystalline polymer that has been separately processed to have a degree of crystallization of 5% or more must be prepared, and further, the method requires a supply line for supplying the pellets of the crystalline polymer having a high degree of crystallization to the pellets of the uncrystallized polymer, and consequently, and therefore has a problem in that the production steps are complicated.

CITATION LIST

Patent Literature

PTL 1: JP 2003-160671A

SUMMARY OF INVENTION

Technical Problem

The present invention has been made in consideration of the above-mentioned situation, and its object is to provide a method for stirring resin pellets that prevents resin pellets from blocking to each other in a liquid.

Solution to Problem

The present inventors have assiduously studied and, as a result, have found that, by engulfing the resin pellets that float in the liquid surface of a liquid of a dispersion medium for the resin pellets into the liquid, the above-mentioned object can be attained. On the basis of this finding, the inventors have completed the present invention.

Specifically, the present invention provides the following:

[1] A method for stirring resin pellets, which includes stirring adhesive resin pellets in a liquid in a stirring tank equipped with a stirring impeller, under the condition satisfying the following relational expression (I):

$$\frac{\rho(Np^{1/3}nD)^2}{\Delta \rho g dp} \geq 10 \quad (I)$$

wherein $\rho$ represents the density of the liquid (kg/m$^3$), Np represents the power number of the stirring impeller, n represents the rotational speed (1/s), D represents the diameter of the stirring impeller (m), $\Delta\rho$ represents the difference in density between the resin pellets and the liquid (kg/m$^3$), g represents the gravitational acceleration (m/s$^2$), and dp represents the particle diameter of the resin pellets (m).

[2] The method for stirring resin pellets according to the above [1], wherein the tensile modulus of elasticity of the adhesive resin pellets is from 1 to 200 MPa according to JIS K 7113, the melt flow rate (MFR) of the adhesive resin pellets is from 1 to 10,000 g/10 min according to JIS K7210 under the condition of a temperature of 230° C. and a weight of 21.18 N.

[3] The method for stirring resin pellets according to the above [1] or [2], wherein the ratio by mass of the resin pellets to the liquid (resin pellets/liquid) is within a range of 2/100 to 25/100.

[4] The method for stirring resin pellets according to any of the above [1] to [3], wherein the temperature of the liquid is 50° C. or lower.

[5] The method for stirring resin pellets according to any of the above [1] to [4], wherein the stirring impeller is a stirring impeller to generate an axial flow and a diagonal flow.

[6] The method for stirring resin pellets according to the above [5], wherein the axial flow and the diagonal flow to be generated by the stirring impeller are upward flows.

[7] The method for stirring resin pellets according to any of the above [1] to [6], wherein the ratio of the distance from the liquid surface in the stirring tank to the stirring impeller ($h_{s1}$) to the diameter of the stirring impeller (D), $h_{s1}$/D is within a range of 0 or more and 0.6 or less.

[8] The method for stirring resin pellets according to any of the above [1] to [7], wherein the ratio of the diameter of the stirring impeller (D) to the inner diameter of the stirring tank (T), D/T is 0.2 or more and 0.5 or less.

Advantageous Effects of Invention

According to the present invention, resin pellets accumulating in the surface of the liquid of a dispersion medium for the resin pellets can be prevented from blocking (for example, bonding or caking) to each other to cause agglomeration.

DESCRIPTION OF EMBODIMENTS

The present invention is described hereinunder. In this description, the numerical range expressed by the wording "a number to another number" means the range that falls between the former number indicating the lower limit of the range and the latter number indicating the upper limit thereof.

[Stirring Method for Resin Pellets]

The stirring method for resin pellets of the present invention includes stirring adhesive resin pellets in a liquid in a stirring tank equipped with a stirring impeller, under the condition satisfying the following relational expression (I):

$$\frac{\rho(Np^{1/3}nD)^2}{\Delta\rho g dp} \geq 10 \quad (I)$$

wherein $\rho$ represents the density of the liquid (kg/m³), Np represents the power number of the stirring impeller, n represents the rotational speed (1/s), D represents the diameter of the stirring impeller (m), $\Delta\rho$ represents the difference in density between the resin pellets and the liquid (kg/m³), g represents the gravitational acceleration (m/s²), and dp represents the particle diameter of the resin pellets (m).

Here, the liquid may be, though not limited thereto, water or water with a small amount of an additive such as a surfactant or the like added thereto.

The value of the above-mentioned expression (I) is, from the viewpoint of preventing resin pellets floating in the surface of the liquid of a dispersion medium, from blocking to each other, 10 or more, preferably 15 or more, more preferably 20 or more.

Here, "blocking" means bonding or caking of resin pellets, and the case where resin pellets get close to each other but do not bond is not to say blocking.

Satisfying the condition of the expression (1) means that the resin pellets floating in the surface of the liquid of a dispersion medium are moving but do not accumulate in the same place.

In the stirring method for resin pellets of the present invention, the tensile modulus of elasticity of the adhesive resin pellets is, according to JIS K 7113, preferably 1 to 200 MPa more preferably 5 to 150 MPa, even more preferably 10 to 100 MPa.

In the stirring method for resin pellets of the present invention, the melt flow rate (hereinafter this may be referred to as "MFR") of the adhesive resin pellets is preferably 1 to 10,000 g/10 min according to JIS K7210 and under the condition of a temperature of 230° C. and a weight of 21.18 N, more preferably 3 to 5,000 g/10 min, even more preferably 5 to 3,000 g/10 min.

Here, the adhesive resin pellets are resin pellets of a crystalline resin that are in an uncrystallized state before crystallization, and in particular, resin pellets having a low melting point are easy to adhere.

Specific examples of the resin to be provided for the adhesive resin pellets are described hereinunder.

Even when the adhesive resin pellets have a tensile modulus of elasticity and MFR each falling within the above-mentioned range, the resin pellets floating in a liquid surface can be engulfed into the liquid and prevented from blocking to each other, so far as the stirring condition satisfies the above-mentioned expression (I).

The measurement methods for the tensile modulus of elasticity and MFR are as described below.

[Measurement of Tensile Modulus of Elasticity]

The tensile modulus of elasticity was measured according to JIS K 7113 under the following condition.

Test piece (No. 2 dumbbell), thickness: 1 mm
Cross head rate: 100 mm/min
Load cell: 100 N
Measurement temperature: 23° C.

[Measurement of Melt Flow Rate (MFR)]

MFR was measured according to JIS K7210 under the condition of a temperature of 230° C. and a weight of 21.18 N.

In the stirring method for resin pellets of the present invention, the ratio by mass of the resin pellets to the liquid (resin pellets/liquid) is, from the viewpoint of preventing the resin pellets from blocking to each other, preferably within a range of 2/100 to 25/100, more preferably 2/100 to 20/100, even more preferably 5/100 to 20/100.

In the stirring method for resin pellets of the present invention, the temperature of the liquid of a dispersion medium for the resin pellets is preferably 50° C. or lower, more preferably 5 to 40° C. In particular, preferably, the temperature is close to the crystallization temperature and is a temperature at which granulation is possible.

In the stirring method for resin pellets of the present invention, the stirring impeller is preferably a stirring impeller to generate an axial flow and a diagonal flow.

Here, "axial flow" means a flow parallel to the axial direction relative to the rotational axis of the stirring impeller, "emission flow (side flow)" is a flow vertical to the axial direction relative to the rotational axis of the stirring impeller, and "diagonal flow" is a mixed flow of an axial flow and an emission flow and is a flow oblique to the rotational axis of the stirring impeller.

Figure 1:
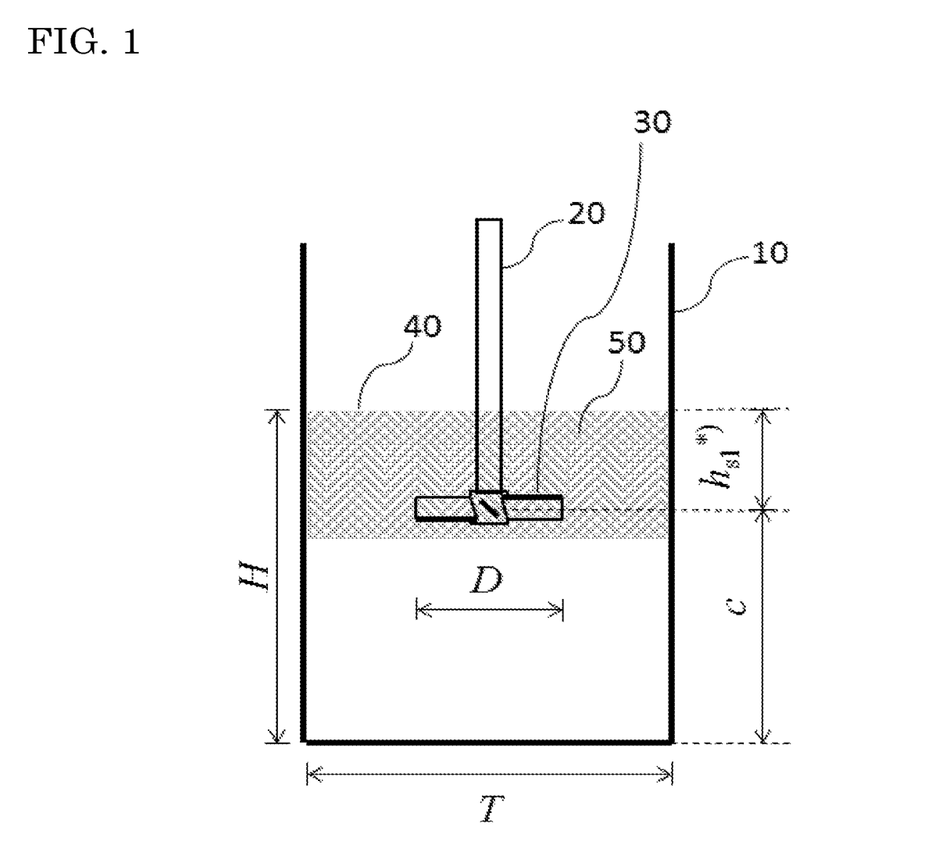
FIG. 1 is a skeleton framework view showing one example of a stirring device for use in the stirring method for resin pellets of the present invention.

In the stirring method for resin pellets of the present invention, a stirring device shown in FIG. 1 can be used. The stirring device shown in FIG. 1 has a stirring tank 10, and a stirring impeller 30 fixed to the rotational axis 20, and the stirring impeller 30 is, as described below, arranged in the position of a distance $h_{s1}$ from the liquid surface 40 of the stirring tank 10. Before and just after stirring, resin pellets 50 float around the liquid surface 40.

As the stirring impeller to generate the above axial flow and diagonal flow, a propeller blade and a pitched blade except a flat blade can be used, and more specifically, a propeller blade, a pitched paddle blade, a pitched turbine blade, a pfaudler blade and the like can be used.

Figure 2:
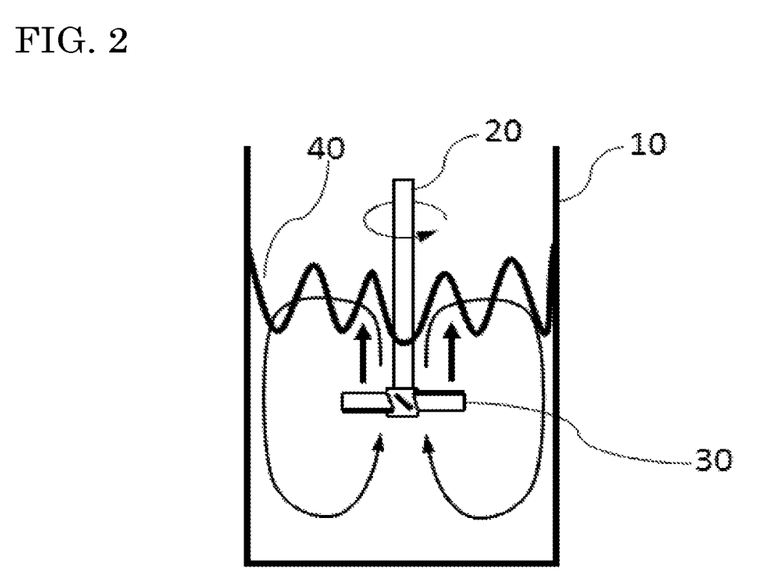
FIG. 2 is a schematic view for explaining a stirring state using a pitched blade to give upward axial flow and diagonal flow.

Further, as shown in FIG. 2, the axial flow and the diagonal flow generated by the stirring impeller 30 run upwardly, and therefore, the liquid surface is ruffled while, on the other hand, the resin pellets floating in the liquid surface are engulfed in the liquid, whereby the resin pellets are prevented from accumulating in the liquid surface and, as a result, the resin pellets are prevented from blocking to each other.

Figure 3:
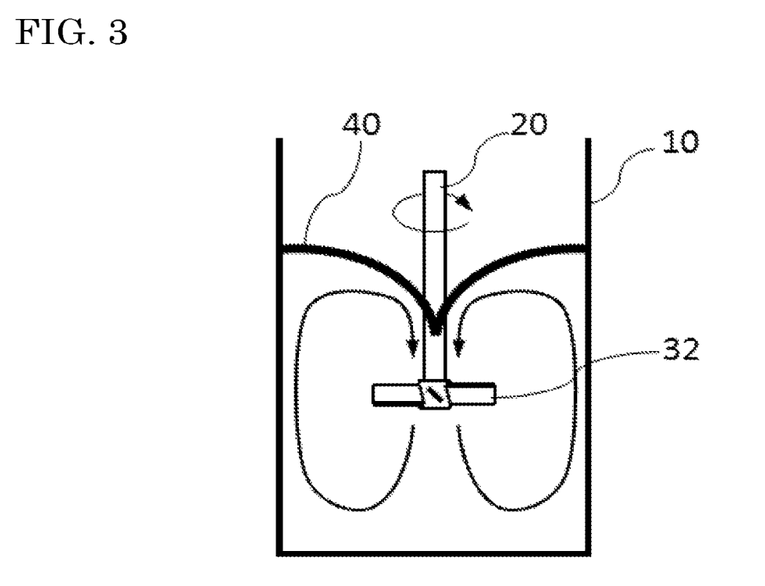
FIG. 3 is a schematic view for explaining a stirring state using a pitched blade to give downward axial flow and diagonal flow.

On the other hand, as shown in FIG. 3, in the case where the axial flow and the diagonal flow generated by the stirring impeller 32 run downwardly, the liquid surface 40 is sucked down around the rotational axis 20, and accordingly, the resin pellets floating in the liquid surface are engulfed in the liquid, and similarly, therefore, the resin pellets in the liquid surface are prevented from accumulating therein and, as a result, the resin pellets are prevented from blocking to each other.

In the stirring method for resin pellets of the present invention, the axial flow and the diagonal flow generated by the stirring impeller 30 are more preferably upward flows from the viewpoint of preventing resin pellets from blocking to each other.

As shown in FIG. 1, from the viewpoint of ruffling the liquid surface 40 to prevent resin pellets from blocking to each other, the ratio of the distance from the liquid surface 40 in the stirring tank 10 to the uppermost stirring impeller 30 $h_{s1}$ to the diameter of the stirring impeller D, $h_{s1}/D$ is preferably within a range of 0.1 or more and 0.6 or less, more preferably 0.2 or more and 0.5 or less, even more preferably 0.2 or more and 0.4 or less.

Figure 4:
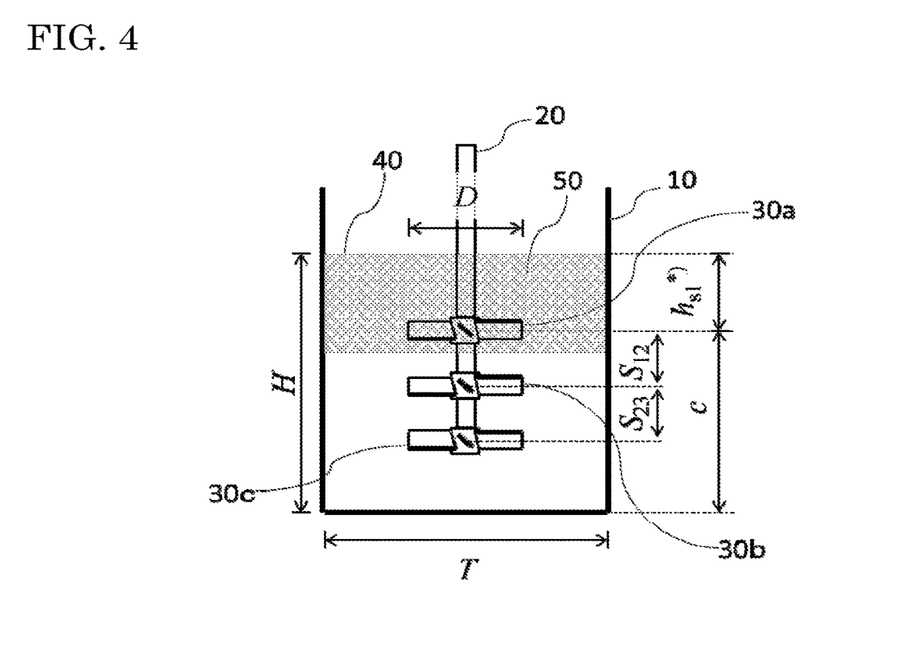
FIG. 4 is a view for explaining a constitution of a multi-stage impeller using plural stirring impellers in a stirring device, in the stirring method for resin pellets of the present invention.

Similarly, in the case where plural stirring impellers are used as in FIG. 4, the ratio of the distance from the liquid surface 40 in the stirring tank 10 to the uppermost stirring impeller 30 $h_{s1}$ to the diameter of the stirring impeller D, $h_{s1}/D$ is preferably within a range of 0 or more and 0.6 or less, more preferably 0 or more and 0.5 or less, even more preferably 0 or more and 0.4 or less, from the viewpoint of ruffling the liquid surface 40 to prevent resin pellets from blocking to each other. The case where $h_{s1}/D$ is 0 means that the uppermost stirring impeller 30 is positioned in the liquid surface 40.

In the stirring method for resin pellets of the present invention, as shown in FIG. 1, the ratio of the diameter of the stirring impeller 40 (D) to the inner diameter of the stirring tank 10 (T), D/T preferably satisfies $0.2 \leq D/T \leq 0.6$, more preferably $0.2 \leq D/T \leq 0.5$, even more preferably $0.3 \leq D/T \leq 0.4$.

The ratio of the diameter of the stirring impeller 40 (D) to the inner diameter of the stirring tank 10 (T), D/T falling within the range provides an advantage that resin pellets exhibit a good behavior from the viewpoint of stirring.

Figure 5:
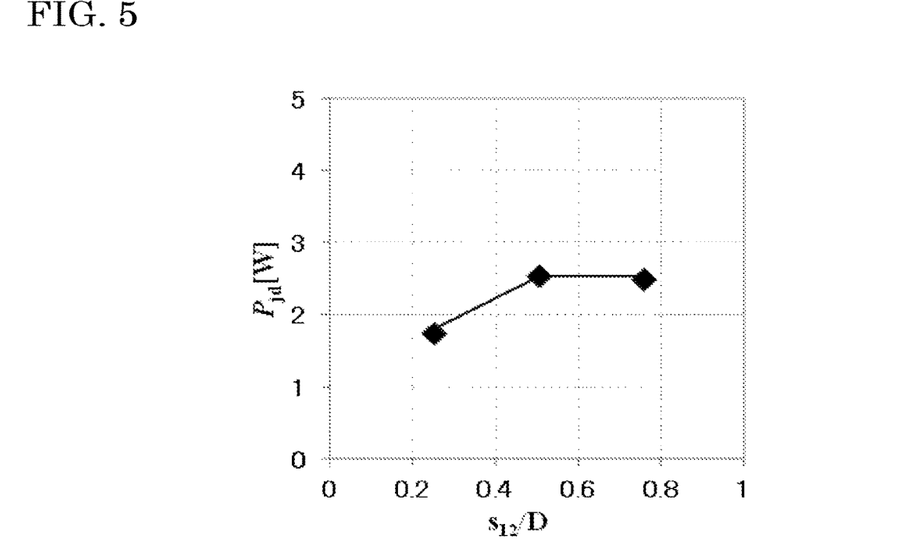
FIG. 5 is a graph showing a relationship between a ratio of the distance between the first stage and the second stage of a stirring impeller ($S_{12}$) to the diameter of the stirring impeller (D), and a dispersive limit power ($P_{jd}$) in the case of using a multistage impeller in the stirring method for resin pellets of the present invention.
Figure 6:
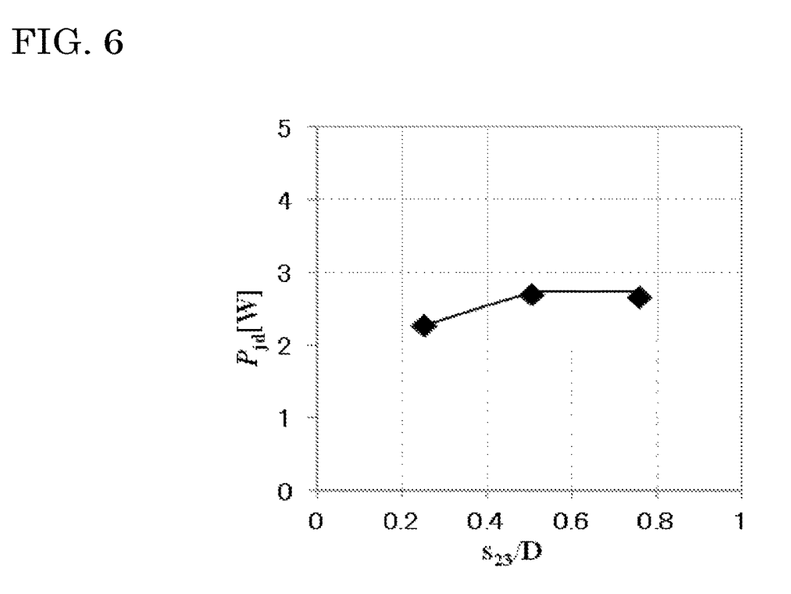
FIG. 6 is a graph showing a relationship between a ratio of the distance between the second stage and the third stage of a stirring impeller ($S_{23}$) to the diameter of the stirring impeller (D), and a dispersive limit power ($P_{jd}$) in the case of using a multistage impeller in the stirring method for resin pellets of the present invention.

In the case of a multistage impeller using plural stirring impellers shown in FIG. 4, preferably, $S_{12}/D \leq 0.3$ and $S_{23}/D \leq 0.3$ as shown in FIGS. 5 and 6. Falling within the range, the stirring power (P) can be a dispersive limit power ($P_{jd}$) or more and the mixing efficiency in the free liquid surface in the stirring tank is thereby improved and, as a result, the resin pellets floating in the liquid surface can be prevented from blocking.

Figure 7:
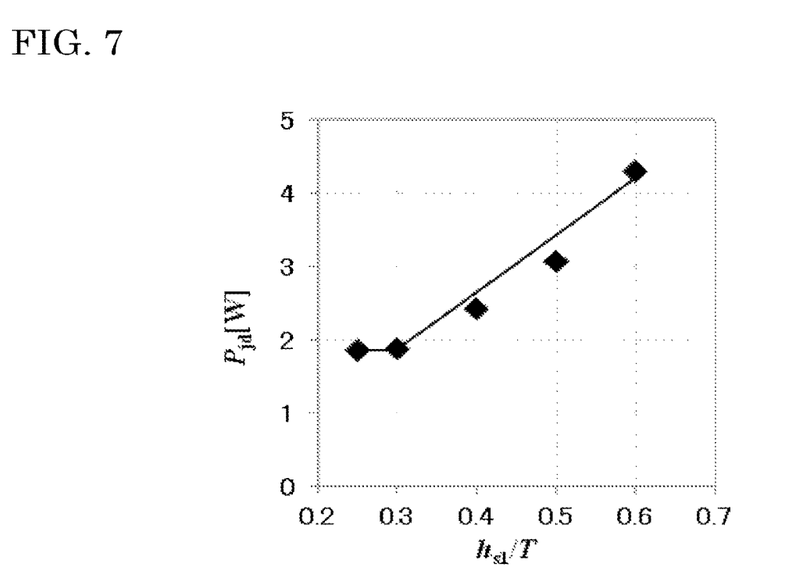
FIG. 7 is a graph showing a relationship between a ratio of the distance from the liquid surface to the first-stage stirring impeller ($h_{s1}$) to the inner diameter of the stirring tank (T), and a dispersive limit power ($P_{jd}$) in the stirring method for resin pellets of the present invention.

Similarly, as shown in FIG. 7, when the ratio of the distance from the liquid surface to the first-stage stirring impeller ($h_{s1}$) to the inner diameter of the stirring tank (T) $h_{s1}/T$ is controlled to be 0.25 to 0.30, the stirring power (P) can be a dispersive limit power ($P_{jd}$) or more and the mixing efficiency in the free liquid surface in the stirring tank is thereby improved and, as a result, the resin pellets floating in the liquid surface can be prevented from blocking.

<Adhesive Resin Pellets>

The adhesive resin to be applied to the stirring method for resin pellets of the present invention is a resin having the above-mentioned physical data, specifically including the following.

[Olefinic Polymer]

The olefinic polymer for use as the adhesive resin is preferably such that the melting endothermic energy amount (ΔH–D), as read on the melting endothermic curve thereof drawn by keeping a sample of the resin in a nitrogen atmosphere at −10° C. for 5 minutes and then heating it at 10° C./min using a differential scanning calorimeter (DSC), is 1 to 80 J/g.

The olefinic polymer for use in the present invention is preferably an olefinic polymer prepared by polymerization of one or more monomers selected from ethylene and α-olefins each having 3 to 28 carbon atoms.

Examples of the α-olefin having 3 to 28 carbon atoms include propylene, 1-butene, 1-pentene, 4-mehtyl-1-pentene, 1-hexene, 1-octene, 1-decene, 1-undecdne, 1-dodecene, 1-tridecene, 1-tetradecene, 1-pentadecene, 1-hexadecene, 1-heptadecene, 1-octadecene, 1-nonadecene, 1-eicosene, etc. Among these, α-olefins each having 3 to 24 carbon atoms are preferred, α-olefins each having 3 to 12 carbon atoms are more preferred, α-olefins each having 3 to 6 carbon atoms are even more preferred, α-olefins each having 3 to 4 carbon atoms are especially preferred, and propylene is most preferred. An olefinic polymer prepared by polymerizing one alone of these may be used, or an olefinic copolymer prepared by copolymerizing two or more of these as combined may also be used. In the present invention, the expression of "olefinic polymer" includes an olefinic copolymer.

The olefinic polymer includes an ethylenic polymer where 50 mol % or more of the monomer constituting the polymer is an ethylene monomer, a propylenic polymer where 50 mol % or more of the monomer constituting the polymer is a propylene monomer, a butenic polymer where 50 mol % or more of the monomer constituting the polymer is a butene monomer etc. From the viewpoint of rigidity and transparency of the molded products to be obtained, the propylenic polymer is more preferred since the molded products thereof can have excellent physical properties, for example, excellent film properties.

The olefinic polymer for use in the present invention is preferably a propylenic polymer selected, for example, from a propylene homopolymer, a propylene-ethylene random copolymer, a propylene-butene random copolymer, a propylene-α-olefin random copolymer, a propylene-ethylene-butene random copolymer, a propylene-ethylene block copolymer, a propylene-butene block copolymer, a propylene-α-olefin block copolymer, a propylene-α-olefin graft copolymer, etc.

Further, the propylenic polymer is more preferably such that 50 mol % or more of the monomer constituting the olefinic polymer is a propylene monomer, and the propylenic polymer may be a polymer satisfying (i) and/or (ii).

(i) A structural unit of ethylene is contained in an amount of more than 0 mol % and 20 mol % or less.

(ii) A structural unit of 1-butene is contained in an amount of more than 0 mol % and 30 mol % or less.

[Melting Endothermic Energy Amount (ΔH-D)]

The melting endothermic energy amount (ΔH-D) of the olefinic polymer and the propylenic polymer is preferably 0 to 80 J/g, more preferably 10 to 70 J/g, even more preferably 20 to 60 J/g, especially preferably 20 to 50 J/g.

In the present invention, using a differential scanning calorimeter (DSC-7, manufactured by Perkin Elmer, Inc.), 10 mg of a sample of the polymer is kept at −10° C. in a nitrogen atmosphere for 5 minutes, and then heated at a rate of 10° C./min, and on the resultant melting endothermic curve of the sample, the area surrounded by the line part including the peak, and the line (base line) drawn by connecting the point on the low-temperature side with no heat quantity change and the point on the high-temperature side with no heat quantity change is calculated to determine the melting endothermic energy amount.

The propylenic polymer for use in the present invention is preferably a propylenic polymer satisfying at least any of the following (1) and (2), more preferably satisfying the following (3) and (4), and even more preferably satisfying the following (5) and (6).

(1) [mmmm] is 20 to 60 mol %.
(2) The melting point (Tm-D) of the polymer, defined as the peak top observed on the highest temperature side in the melting endothermic curve obtained using a differential scanning calorimeter (DSC), keeping a sample of the polymer in a nitrogen atmosphere at −10° C. for 5 minutes, and then heating it at 10° C./min, is 0 to 120° C.
(3) [rrrr]/(1−[mmmm])≤0.1.
(4) Molecular weight distribution (Mw/Mn)<4.0.
(5) [rmrm]>2.5 mol %.
(6) [mm]×[rr]/[mr]$^2$≤2.0.

(1) Meso Pentad Fraction [mmmm]

The meso pentad fraction [mmmm] is an index of indicating the stereoregularity of the propylenic polymer, and the polymer having a larger meso pentad fraction [mmmm] has a higher degree of stereoregularity.

(2) Melting Point (Tm-D)

The melting point (Tm-D) of the propylenic polymer is, from the viewpoint of strength and moldability, preferably high, and is preferably 0 to 120° C., more preferably 50 to 100° C., even more preferably 55 to 90° C., still more preferably 60 to 80° C.

In the present invention, the peak top of a peak observed on the highest temperature side in a melting endothermic curve obtained by using a differential scanning calorimeter (manufactured by PerkinElmer Co., Ltd., DSC-7), and keeping 10 mg of a sample of the polymer in a nitrogen atmosphere at −10° C. for 5 minutes, and then raising the temperature at 10° C./min is defined as the melting point (Tm-D). The melting point can be controlled by suitably controlling the monomer concentration or the reaction pressure.

(3) [rrrr]/(1−[mmmm])

The value of [rrrr]/(1−[mmmm]) can be obtained from the meso pentad fraction [mmmm] and the racemic pentad fraction [rrrr], and is an index of indicating regularity distribution evenness of polypropylene. One having a large value of [rrrr]/(1−[mmmm]) is a mixture of a high-stereoregularity polypropylene and an atactic polypropylene such as a conventional polypropylene produced using an already-existing catalyst system, and causes stickiness of the formed, stretched polypropylene film. The unit of [rrrr] and [mmmm] in the above is mol %.

The value of [rrrr]/(1−[mmmm]) of the propylenic polymer is, from the viewpoint of stickiness, preferably 0.1 or less, more preferably 0.001 to 0.05, even more preferably 0.001 to 0.04, still more preferably 0.01 to 0.04.

Here, the meso pentad fraction [mmmm] and the racemic pentad fraction [rrrr], and the racemic meso racemic meso pentad fraction [rmrm] to be mentioned below are determined in accordance with the method proposed in "Macromolecules, 6, 925 (1973)" by A. Zambelli et al., and are a meso fraction, a racemic fraction and a racemic meso racemic meso fraction in the pentad unit in a polypropylene molecular chain measured with the signal of the methyl group in the $^{13}$C—NMR spectrum thereof. When the meso pentad fraction [mmmm] is large, the stereoregularity increases. The triad fractions [mm], [rr] and [mr] to be mentioned below are also calculated according to the above-mentioned method.

(4) Molecular Weight Distribution (Mw/Mn)

The molecular weight distribution (Mw/Mn) of the propylenic polymer is, from the viewpoint of high intensity, preferably less than 4. When the molecular weight distribution (Mw/Mn) is less than 4, low-molecular weight components that may have some negative influences on stretchability and film properties (for example, mechanical properties, optical properties) can be prevented from forming and the film properties of the stretched polypropylene film of the present invention to be mentioned below can be prevented from worsening. The molecular weight distribution (Mw/Mn) of the olefinic polymer and the propylenic polymer is preferably 3 or less, more preferably 2.5 or less, even more preferably 1.5 to 2.5.

In the present invention, the molecular weight distribution (Mw/Mn) is a value calculated from the polystyrene-equivalent weight-average molecular weight Mw and number-average molecular weight Mn of the polymer measured through gel permeation chromatography (GPC).

(5) Racemic Meso Racemic Meso Pentad Fraction [rmrm]

The racemic meso racemic meso pentad fraction [rmrm] is an index of indicating the stereoregularity randomicity of polypropylene, and a larger value thereof indicates increase in randomicity of polypropylene.

The racemic meso racemic meso fraction [rmrm] of the propylenic polymer is preferably more than 2.5 mol %, more preferably 2.6 mol % or more, even more preferably 2.7 mol % or more. The upper limit thereof is generally preferably 10 mol % or so, more preferably 7 mol %, even more preferably 5 mol %, still more preferably 4 mol %.

(6) [mm]×[rr]/[mr]$^2$

The value of [mm]×[rr]/[mr]$^2$ that is calculated from the triad fractions [mm], [rr] and [mr] indicates an index of the randomicity of a polymer, and when the value is nearer to 1, the randomicity of the polymer is higher. The value of the above expression of the propylenic polymer for use in the present invention is generally 2 or less, preferably 1.8 to 0.5, more preferably 1.5 to 0.5. The unit of [mm] and [rr] in the above is mol %.

The advantageous effects of the present invention become larger when the crystallization time of the resin of the adhesive resin pellets is longer, and a resin having a semi-crystallization time of 1 minute or longer can exhibit a large anti-blocking effect, and a resin having a semi-crystallization time of 5 minutes or longer can exhibit a larger anti-blocking effect.

Regarding the propylenic polymer mentioned above, for example, propylene may be polymerized into a propylene homopolymer using a metallocene catalyst described in WO2003/087172. In particular, using a transition metal compound in which ligands form a crosslinked structure via crosslinking groups is preferred, and above all, a metallocene catalyst to be obtained by combining a transition metal compound having a crosslinked structure via two crosslinking groups and a promoter is preferred.

Specific examples of the catalyst include a polymerization catalyst containing a component selected from:
(i) a transition metal compound represented by a general formula (I):

wherein M represents a metal element of Groups 3 to 10 of the Periodic Table or a metal element of the lanthanoid series; $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and form a crosslinked structure through $A^1$ and $A^2$, and these may be the same as or different from each other; X represents a σ-bonding ligand, and when plural X's are present, plural X's may be the same as or different from each other and may be crosslinked with any other X, $E^1$, $E^2$, or Y; Y represents a Lewis base, and when plural Y's are present, plural Y's may be the same as or different from each other and may be crosslinked with any other Y, $E^1$, $E^2$, or X; $A^1$ and $A^2$ each are a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —$SO_2$—, —Se—, —$NR^1$—, —$PR^1$—, —$P(O)R^1$—, —$BR^{1-}$, or —$AlR^1$—, wherein $R^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other; q is an integer of 1 to 5 and represents [(the atomic valence of M)–2]; and r represents an integer of 0 to 3, and (ii) a component selected from (ii-1) a compound capable of reacting with a transition metal compound of the component (i) or a derivative thereof to form an ionic complex and (ii-2) an aluminoxane.

The transition metal compound of the above component (i) is preferably a (1,2')(2,1') double-crosslinked transition metal compound, and examples thereof include (1,2'-dimethylsilylene)(2,1'-dimethylsilylene)bis(3-trimethylsilylmethylindenyl)zirconium dichloride.

Specific examples of the compound of the above component (ii-1) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenylborate), benzyl(tri-n-butyl)ammonium tetrakis(pentafluorophenyl)borate, methyl diphenylammonium tetrakis(pentafluorophenyl)borate, triphenyl(methyl)ammonium tetrakis(pentafluorophenyl)borate, methyl anilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate, silver trifluoromethanesulfonate, etc.

The aluminoxane of the component (ii-2) includes known linear aluminoxanes and cyclic aluminoxanes.

In addition, using an organic aluminum compound such as trimethyl aluminum, tri ethyl aluminum, triisopropyl aluminum, triisobutyl aluminum, dim ethyl aluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride or the like can be used as combined with the above to produce the propylenic polymer.

[Other Adhesive Resins]

Examples of the propylenic polymer produced using a metallocene catalyst similarly to the above include a copolymer of propylene and ethylene (Vistamaxx manufactured by Exxon Mobil Corporation, etc.), a copolymer of ethylene and octene (Engage manufactured by The Dow Chemical Company, etc.), a copolymer of propylene, ethylene and butane (Bestoplasto manufactured by Degussa AG, etc.), etc.

EXAMPLES

Next, the present invention will be described in more detail with reference to Examples, but the present invention is by no means limited to these Examples.

Measurement methods for the olefinic polymer, the propylenic polymer and the adhesive resin used in Examples are described below.

[DSC Measurement]

Using a differential scanning calorimeter (manufactured by PerkinElmer Co., Ltd., DSC-7), 10 mg of a sample was kept in a nitrogen atmosphere at −10° C. for 5 minutes, and then heated at 10° C./min. From the resultant melting endothermic curve, the melting endothermic energy amount ΔH–D was determined. In addition, from the peak top of the peak observed on the highest temperature side of the resultant melting endothermic curve, the melting point (Tm–D) was determined.

The melting endothermic energy amount (ΔH–D) is calculated as follows. A line drawn by connecting a point on the low-temperature side with no heat quantity change and a point on the high-temperature side with no heat quantity change is referred to as a base line, and the area surrounded by the baseline and a line part including peaks of the melting endothermic curve drawn through DSC using a differential scanning calorimeter (DSC-7, manufactured by Perkin Elmer, Inc.) is calculated to determine the melting endothermic energy amount.

[Measurement of Weight-Average Molecular Weight (Mw) and Molecular Weight Distribution (Mw/Mn)]

The weight-average molecular weight (Mw) and the number-average molecular weight (Mn) were measured through gel permeation chromatography (GPC), and the molecular weight distribution (Mw/Mn) was determined. In the measurement, the following device was used under the following condition, and the polystyrene-equivalent weight-average molecular weight and number-average molecular weight were measured. The molecular weight distribution (Mw/Mn) is calculated from these weight-average molecular weight (Mw) and number-average molecular weight (Mn).

<GPC Measuring Device>
Column: "TOSO GMHHR-H(S)HT" manufactured by Tosoh Corporation
Detector: RI detector for liquid chromatogram, "Waters 150 C" manufactured by Waters Corporation <Measurement Condition>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis software: HT-GPC (ver. 1.0)

[NMR Measurement]

$^{13}C$—NMR spectrometry was carried out using the following device under the following condition. For peak assignment, the method proposed in "Macromolecules, 8, 687 (1975)" by A. Zambelli, et al was referred to.

Device: $^{13}C$—NMR spectrometer, JNM-EX400 series manufactured by JEOL, Ltd.
Method: proton complete decoupling method
Concentration: 220 mg/mL
Solvent: mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times <Calculation Formulae>

$$M=m/S \times 100$$

$$R=\gamma/S \times 100$$

$$S=P\beta\beta+P\alpha\beta+P\alpha\gamma$$

S: signal strength of side-chain methyl carbon atom in all propylene units
Pββ: 19.8 to 22.5 ppm
Pαβ: 18.0 to 17.5 ppm
Pαγ 17.5 to 17.1 ppm
γ: racemic pentad chain: 20.7 to 20.3 ppm
m: meso pentad chain: 21.7 to 22.5 ppm The meso pentad fraction [mmmm], the racemic pentad fraction [rrrr], and the racemic meso racemic meso pentad fraction [rmrm] are determined in accordance with the method proposed in "Macromolecules, 6, 925 (1973)" by A. Zambelli et al, and are the meso fraction, the racemic fraction and the racemic meso racemic meso fraction, respectively in the pentad unit in the polypropylene molecular chain measured by the signal of the methyl group in $^{13}C$—NMR spectrometry. A larger value of the meso pentad fraction [mmmm] means higher stereoregularity. In addition, the triad fractions [mm], [rr] and [mr] were also calculated according to the above-mentioned method.

[Measurement of Melt Flow Rate (MFR)]

According to JIS K7210, the melt flow rate was measured under the condition of a temperature of 230° C. and a load of 2.16 kg.

[Measurement of Semi-Crystallization Time]

The semi-crystallization time of the resin component was measured according to the following method.

Using FLASH DSC (manufactured by Mettler-Toledo International Inc.), the time is measured according to the following method.

(1) The sample is melted by heating at 230° C. for 2 minutes, and then cooled down to 25° C. at 2000° C./sec, and the time-dependent change in heat generation in the isothermal crystallization process at 25° C. is checked.

(2) An integrated value of the quantity of heat generation from the start of isothermal crystallization to the finish of crystallization is referred to as 100%, and the time in which the integrated value of the quantity of heat generation from the start of isothermal crystallization reaches 50% is referred to as the semi-crystallization time.

[Measurement of Tensile Modulus of Elasticity]

Resin pellets shown in Table 2 were press-molded to prepare a test piece, and the tensile modulus of elasticity of the base polymer was measured according to JIS K 7113 under the following condition.

Test piece (No. 2 dumbbell), thickness: 1 mm
Cross head rate: 100 mm/min
Load cell: 100 N
Measurement temperature: 23° C.

[Measurement of Limiting Viscosity]

Using an automatic viscometer, VMR-053 Model by Rigo Co., Ltd., the limiting viscosity was measured in a solvent tetralin at 135° C.

Production Example 1

Production of Polypropylene Polymer (PP1)

To a stainless steel reactor having an internal volume of 20 L and equipped with a stirrer, n-heptane at 20 L/hr, triisobutylaluminum at 15 mmol/hr, and further a catalyst component prepared by previously bringing dimethylanilinium tetrakispentafluorophenyl borate, (1,2'-dimethylsilylene)(2,1'-dimethylsilylene)-bis(3-trimethylsilylmethylindenyl)zirconium dichloride, triisobutylaluminum and propylene in a ratio by mass of 1/2/20 into contact with one another at 6 μmol/hr in terms of zirconium were continuously supplied.

Then, propylene and hydrogen were continuously supplied thereto so that the total pressure in the reactor could be kept at 1.0 MPa·G and the polymerization temperature was suitably controlled at around 65° C. to give a solution containing a polymer having a desired molecular weight.

To the thus obtained polymerization solution, an antioxidant was added so that the content thereof in the polymerization solution could be 1,000 ppm by mass, and then the solvent n-heptane was removed to give a polypropylene polymer (PP1).

Production Example 2

Production of Polypropylene Polymer (PP2)

To a stainless steel reactor having an internal volume of 20 L and equipped with a stirrer, n-heptane at 20 L/hr, triisobutylaluminum at 15 mmol/hr, and further a catalyst component prepared by previously bringing dimethylanilinium tetrakispentafluorophenyl borate, (1,2'-dimethylsilylene)(2,1'-dimethylsilylene)-bis(3-trimethylsilylmethylindenyl)zirconium dichloride, triisobutylaluminum and propylene in a ratio by mass of 1/2/20 into contact with one another at 30 µmol/hr in terms of zirconium were continuously supplied.

Then, propylene and hydrogen were continuously supplied thereto so that the total pressure in the reactor could be kept at 1.0 MPa·G in such a manner that the proportion of hydrogen is much smaller than that in Production Example 1, and the polymerization temperature was suitably controlled at around 70° C. to give a solution containing a polymer having a desired molecular weight.

To the thus obtained polymerization solution, an antioxidant was added so that the content thereof in the polymerization solution could be 1,000 ppm by mass, and then the solvent n-heptane was removed to give a polypropylene polymer (PP2).

The polypropylene polymer (PP1) and the polypropylene polymer (PP2) obtained in Production Examples 1 and 2 were analyzed in the manner as above. The results are shown in Table 1 below.

TABLE 1

|  | Production Example | |
|---|---|---|
|  | 1 | 2 |
| Tensile Modulus of Elasticity (MPa) | 102 | 35 |
| MFR (230° C.) | 48 | 53 |
| mmmm (mol %) | 50 | 45 |
| [η] (dl/g) | 1.18 | 1.12 |
| Mw | 130000 | 120000 |
| Mw/Mn | 2 | 2.1 |
| Melting Point (Tm-D) (° C.) | 76 | 70 |
| Melding Endothermic Energy Amount (ΔH-D) (J/g) | 39.1 | 27.5 |
| Semi-Crystallization Time (min) | 14.7 | 50.9 |

Next, the polypropylene polymer (PP1) produced in Production Example 1 was pelletized with a pelletizer, and the resultant pellets were stirred in water for crystallization. At this time, the pellets floating around the surface of the tank were visually checked for the condition thereof as to whether or not they were engulfed into the liquid. A condition where the pellets floating in the liquid surface were kept not accumulating therein continuously for 10 minutes or more was set as a criterion for decision. The decided results are shown in Table 2.

In Table 2, the symbols in the relational expression are as follows.

$\rho$ represents the density of the liquid (kg/m$^3$), and since the liquid is almost water, $\rho$ is 1,000 kg/m$^3$, Np represents the power number of the stirring impeller, and as shown in Table 2.

n represents the rotational speed of the stirring shaft (1/s), and as shown in Table 2.

D represents the diameter of the stirring impeller (m), and as shown in Table 2.

$\Delta\rho$ represents the difference in density between the resin pellets and the liquid (kg/m$^3$), and this was derived from the difference between the density of the resin pellets and the density of the liquid.

g represents the gravitational acceleration (m/s$^2$), and is 9.80665 m/s$^2$.

dp represents the particle diameter of the resin pellets (m). For this, the particle diameter of the resin pellets used in Table 2 was measured, and an average of the data of 100 resin pellets among those analyzed herein is referred to as dp.

TABLE 2

| | Example 1 | Example 2 | Example 3 | Example 4 | Example 5 | Example 6 | Example 7 | Example 8 | Example 9 | Example 10 | Example 11 | Example 12 | Example 13 | Comparative Example 1 |
|---|---|---|---|---|---|---|---|---|---|---|---|---|---|---|
| $\dfrac{\rho(Np^{1/3}nD)^2}{\Delta\rho g d p}$ | 63 | 93 | 124 | 167 | 55 | 242 | 101 | 102 | 132 | 187 | 119 | 141 | 166 | 9 |
| Tensile Modulus of Elasticity of Adhesive Resin Pellets (MPa) | 94 | 94 | 94 | 94 | 94 | 94 | 94 | 94 | 94 | 94 | 94 | 94 | 94 | 94 |
| Melt Flow Rate (MFR) [g/10 min] | 2000 | 2000 | 2000 | 2000 | 2000 | 2000 | 2000 | 2000 | 2000 | 2000 | 2000 | 2000 | 2000 | 2000 |
| Ratio by Mass of Resin Pellets/Liquid | 15/100 | 15/100 | 15/100 | 25/100 | 5/100 | 25/100 | 5/100 | 15/100 | 15/100 | 15/100 | 15/100 | 15/100 | 15/100 | 15/100 |
| Temperature of Liquid in Stirring Tank (° C.) | 20 | 20 | 20 | 20 | 20 | 20 | 20 | 20 | 20 | 20 | 20 | 20 | 20 | 20 |
| Upward/Downward Axial Flow/Diagonal Flow | upward | upward | upward | upward | upward | downward | downward | downward | downward | downward | downward | downward | downward | upward |
| Ratio of distance (hs1) from liquid surface to uppermost stage to stirring impeller (D) (hs1/D) | 0.3 | 0.4 | 0.5 | 0.3 | 0.3 | 0.3 | 0.3 | 0.3 | 0.4 | 0.5 | 0.3 | 0.4 | 0.5 | 0.3 |
| Ratio of diameter (D) of stirring impeller to inner diameter (T) of stirring tank (D/T) | 0.39 | 0.39 | 0.39 | 0.39 | 0.39 | 0.39 | 0.39 | 0.32 | 0.32 | 0.32 | 0.39 | 0.39 | 0.39 | 0.39 |
| State of Resin Pellets Accumulation | Not accumulated | Not accumulated | Not accumulated | Not accumulated | Not accumulated | Not accumulated | Not accumulated | Not accumulated | Not accumulated | Not accumulated | Not accumulated | Not accumulated | Not accumulated | Accumulated |
| Stirring Power [W] | 0.7 | 1.3 | 2.0 | 3.1 | 0.6 | 5.5 | 1.5 | 3.0 | 4.3 | 7.3 | 1.7 | 2.6 | 3.2 | 0.04 |
| Diameter (D) of Stirring Impeller (unit: m) | 0.075 | 0.075 | 0.075 | 0.075 | 0.075 | 0.075 | 0.075 | 0.06 | 0.06 | 0.06 | 0.075 | 0.075 | 0.075 | 0.075 |
| Power Number (Np) of Stirring Impeller | 1.03 | 1.03 | 1.03 | 1.03 | 1.03 | 1.03 | 1.03 | 1.03 | 1.03 | 1.03 | 1.03 | 1.03 | 1.03 | 1.03 |
| Rotational Speed of Stirring Shaft (n) (unit: 1/s) | 5.67 | 6.90 | 7.97 | 9.25 | 5.32 | 11.13 | 7.20 | 9.03 | 10.28 | 12.23 | 7.82 | 8.50 | 9.22 | 2.15 |

As obvious from Table 2, it is confirmed that, in the case where an adhesive resin is stirred in a liquid in a stirring tank equipped with a stirring impeller, when the resin pellets are stirred under the condition satisfying the following relational expression (I) defined in the present invention, the resin pellets could be prevented from accumulating and could be prevented from blocking to each other.

$$\frac{\rho(Np^{1/3}nD)^2}{\Delta\rho g dp} \geq 10 \quad (I)$$

In addition, it is also confirmed that, when the other influencing factors in the vertical line in Table 2 each fall within the range defined in the present invention, the resin pellets can be stirred well and can be prevented from accumulating and from blocking to each other.

Next, using the polypropylene polymer (PP2) produced in Production Example 2, the pellets pelletized with a pelletizer were stirred in water for crystallization. At this time, the pellets floating around the surface of the tank were visually checked for the condition thereof as to whether or not they were engulfed into the liquid. A condition where the pellets floating in the liquid surface were kept not accumulating therein continuously for 10 minutes or more was set as a criterion for decision. The decided results are shown in Table 3.

In Table 3, the symbols in the relational expression are the same as above, and describing them is omitted here.

TABLE 3

| | Example 14 | Comparative Example 1 |
|---|---|---|
| $\frac{\rho(Np^{1/3}nD)^2}{\Delta\rho g dp}$ | 63 | 9 |
| Tensile Modulus of Elasticity of Adhesive Resin Pellets (MPa) | 32 | 94 |
| Melt Flow Rate (MFR) [g/10 min] | 2200 | 2000 |
| Ratio by Mass of Resin Pellets/Liquid | 15/100 | 15/100 |
| Temperature of Liquid in Stirring Tank (° C.) | 20 | 20 |
| Upward/Downward Axial Flow/Diagonal Flow | Upward | Upward |
| Ratio of distance (hs1) from liquid surface to uppermost stage to stirring impeller (D) (hs1/D) | 0.3 | 0.3 |
| Ratio of diameter (D) of stirring impeller to inner diameter (T) of stirring tank (D/T) | 0.39 | 0.39 |
| State of Resin Pellets Accumulation | Not accumulated | Accumulated |
| Stirring Power [W] | 0.7 | 0.04 |
| Diameter (D) of Stirring Impeller (unit: m) | 0.075 | 0.075 |
| Power Number (Np) of Stirring Impeller | 1.03 | 1.03 |
| Rotational Speed of Stirring Shaft (n) (unit: 1/s) | 5.67 | 2.15 |

INDUSTRIAL APPLICABILITY

The stirring method for resin pellets of the present invention can be widely used for stirring adhesive resin pellets while preventing the resin pellets from blocking to each other in stirring them.

REFERENCE SIGNS LIST

10 Stirring Tank
20 Stirring Shaft
30, 30a, 30b, 30c Stirring Impeller
40 Liquid Surface
50 Resin Pellets

The invention claimed is:

1. A method for stirring resin pellets, which comprises stirring adhesive resin pellets in a liquid in a stirring tank equipped with a stirring impeller, under the condition satisfying the following relational expression (I):

$$\frac{\rho(Np^{1/3}nD)^2}{\Delta\rho g dp} \geq 10 \quad (I)$$

wherein ρ represents the density of the liquid (kg/m³), Np represents the power number of the stirring impeller, n represents the rotational speed (1/s), D represents the diameter of the stirring impeller (m), Δρ represents the difference in density between the resin pellets and the liquid (kg/m³), g represents the gravitational acceleration (m/s²), and dp represents the particle diameter of the resin pellets (m).

2. The method for stirring resin pellets according to claim 1, wherein
the tensile modulus of elasticity of the adhesive resin pellets is from 1 to 200 MPa according to JIS K 7113, and
the melt flow rate (MFR) of the adhesive resin pellets is from 1 to 10,000 g/10 min according to JIS K7210 under the condition of a temperature of 230° C. and a weight of 21.18N.

3. The method for stirring resin pellets according to claim 1, wherein a ratio by mass of the resin pellets to the liquid (resin pellets/liquid) is within a range of 2/100 to 25/100.

4. The method for stirring resin pellets according to claim 1, wherein the temperature of the liquid is 50° C. or lower.

5. The method for stirring resin pellets according to claim 1, wherein the stirring impeller is a stirring impeller to generate an axial flow and a diagonal flow.

6. The method for stirring resin pellets according to claim 5, wherein the axial flow and the diagonal flow to be generated by the stirring impeller are upward flows.

7. The method for stirring resin pellets according to claim 1, wherein a ratio of the distance from the liquid surface in the stirring tank to the stirring impeller ($h_{s1}$) to the diameter of the stirring impeller (D), $h_{s1}$/D is within a range of 0 or more and 0.6 or less.

8. The method for stirring resin pellets according to claim 1, wherein a ratio of the diameter of the stirring impeller (D) to the inner diameter of the stirring tank (T), D/T satisfies 0.2 ≤D/T ≤0.6.

* * * * *